June 30, 1959  S. LUBKIN  2,892,934
FREQUENCY DIVIDER
Filed Jan. 4, 1954  2 Sheets-Sheet 1

INVENTOR.
SAMUEL LUBKIN
BY S.C. Yuter
ATTORNEY.

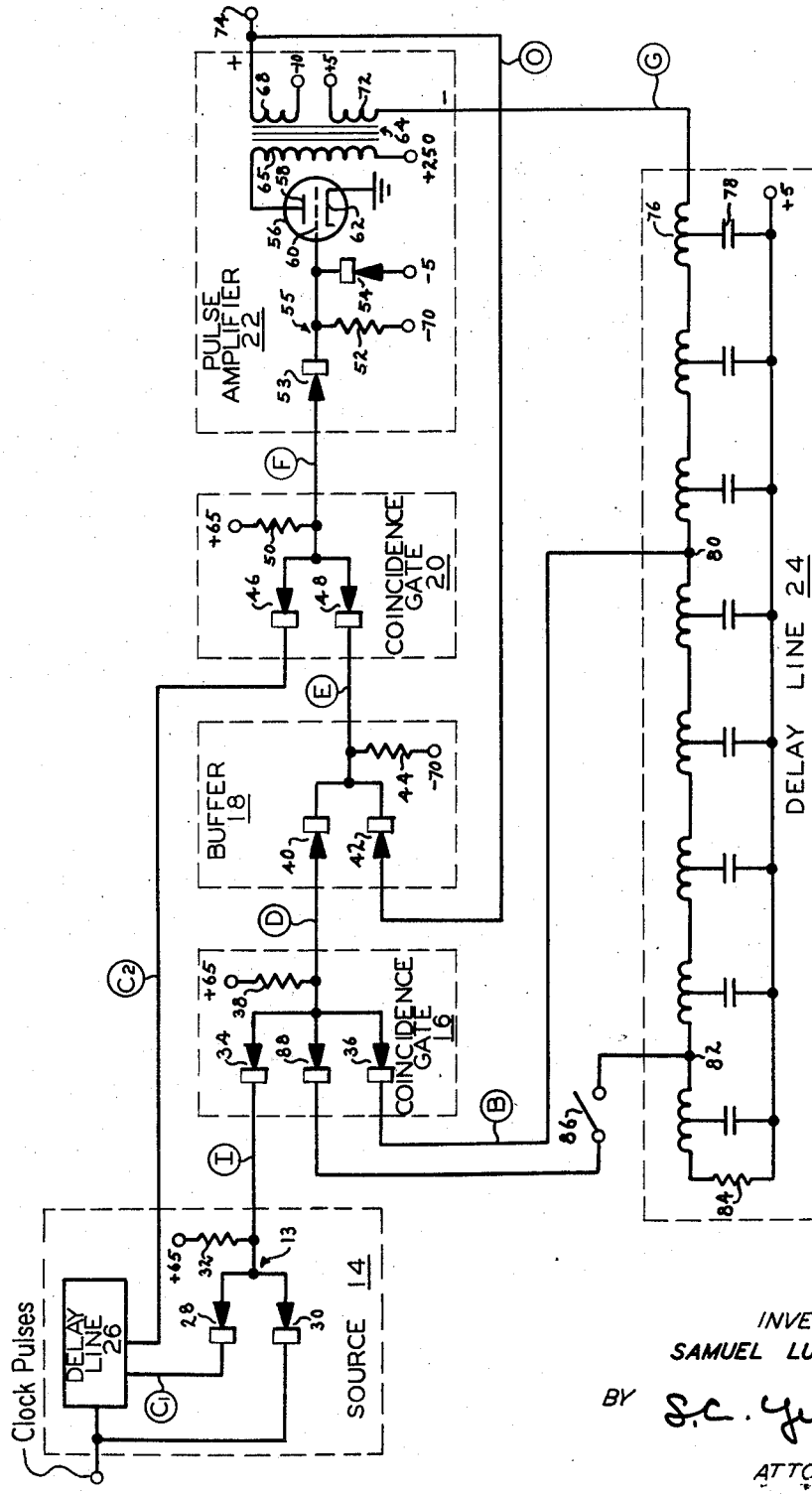

United States Patent Office 2,892,934
Patented June 30, 1959

2,892,934
FREQUENCY DIVIDER

Samuel Lubkin, Brooklyn, N.Y., assignor to Underwood Corporation, New York, N.Y., a corporation of Delaware Application January 4, 1954, Serial No. 401,887

3 Claims. (Cl. 250—27)

This invention relates to scalers, and more particularly to a scaling circuit which is controllable to provide a predetermined scale.

A scaler is a device for providing one output pulse in response to any desired number of input pulses. Thus, a binary scaler provides a scale of two; that is, it provides one output pulse for every two input pulses supplied to the input of the scaler.

A counter or frequency divider to any scale in powers of two may be constructed by appropriately joining binary scalers in cascade. Thus, three binary scalers connected in cascade provide a scale of eight, the third scaler providing one output pulse for every eight pulses supplied to the input of the first scaler. If a factor of three is desired then a ternary scaler may be used for counting or dividing to any scale in powers of three. However, in either case the scaling circuit is limited to scales in powers of two or three.

Accordingly, it is an object of the invention to provide a reliable scaling circuit which is capable of counting on any predetermined scale.

Another object of the invention is the provision of a scaler which is of simple and inexpensive design, and stable in operation.

Still another object of the invention is to provide a scaling circuit in which the selection of the scale is accomplished with a minimum of adjustment.

In accordance with the invention the scaling circuit includes input means responsive to input pulses to produce output pulses and control pulses, controlling means responsive to the control pulses and effective to block the input means for predetermined periods of time related to a predetermined scale, the input means producing output pulses according to the predetermined scale.

For a better understanding of the invention as well as other objects, features and advantages thereof, reference is had to the following detailed description to be read in conjunction with the accompanying drawings, in which:

Fig. 2 is a schematic circuit diagram of another embodiment of a scaling circuit in accordance with the invention.

Figure 1:
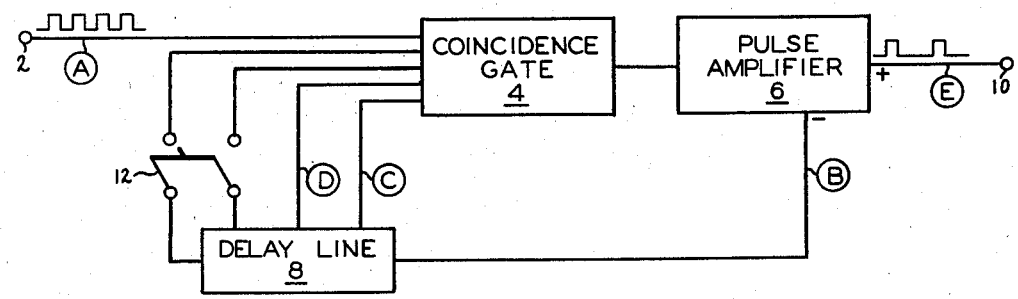
Fig. 1 is a block diagram showing a scaling circuit of a preferred embodiment of the invention.

Referring now to the scaling circuit shown in Fig. 1, an input terminal 2 is connected to a coincidence gate 4. The coincidence gate 4 is a circuit having an output and a multiplicity of inputs so designed that the output is energized when and only when a certain definite set of input conditions are met. Thus, when there is a coincidence of positive signals at the inputs, a positive signal is transmitted from the output.

The coincidence gate 4 is coupled to a pulse amplifier 6 provided with positive and negative output terminals. When the pulse amplifier 6 is non-conducting the positive output terminal is at a negative potential, while the negative output terminal is at a positive potential. These conditions are the normally existing conditions at the output terminals of the pulse amplifier 6.

When a positive pulse is applied to the input of the pulse amplifier 6 it causes a positive pulse to be produced at the positive output terminal and a negative pulse to be produced at the negative output terminal.

The positive output terminal of the pulse amplifier 6 is coupled to the output terminal 10, while the negative output terminal of the pulse amplifier 6 is coupled to the delay line 8.

The delay line 8 is a multi-tapped delay line of the lumped parameter type which functions to delay received pulses for discrete periods of time. The taps of the delay line 8 are selectively coupled to inputs of the coincidence gate 4.

The coincidence gate 4, the pulse amplifier 6 and the delay line 8 will be disclosed in greater detail hereinafter.

Figure 3:
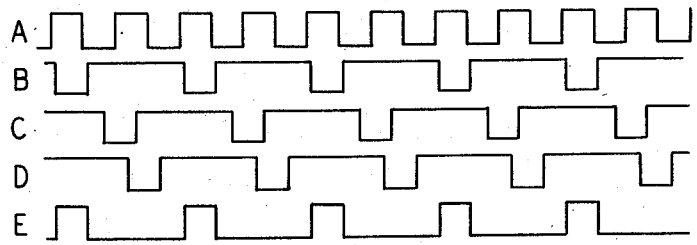
Fig. 3 shows the wave forms existing at various points of the scaling circuit shown in Fig. 1 when adapted to operate as a binary scaler.

In Fig. 3 several idealized wave forms are shown as pulse series A to E for explaining the operation of the scaler shown in Fig. 1. Wave form A is representative of a series of input pulses having, by way of example, a fifty percent duty cycle. The input pulses are applied to the input terminal 2.

Referring to Figs. 1 and 3, the pulse amplifier 6 is initially in its normal condition and therefore the negative output terminal is at a positive potential. Consequently, the coincidence gate 4 is positively conditioned via the taps of the delay line 8.

The first pulse of the A series of pulses passes via coincidence gate 4 to the input of the pulse amplifier 6. This pulse causes a positive pulse (the first pulse of the E series of pulses) to be produced at the positive output terminal a short time thereafter (due to the inherent delay of the pulse amplifier 6), and a negative pulse (the first pulse of the B series of pulses) to be produced simultaneously at the negative output terminal.

The positive pulse produced at the positive output terminal of the pulse amplifier 6 is applied to the output terminal 10. The negative pulse produced at the negative output terminal of the pulse amplifier 6 is applied to the delay line 8.

After being delayed for approximately three quarters of a pulse period, a negative pulse (the first pulse of the C series of pulses) is applied to an input of the coincidence gate 4. After being delayed for approximately another three eighths of a pulse period, a negative pulse (the first pulse of the D series of pulses) is applied to another input of the coincidence gate 4.

It should be noted that the negative pulses tapped off the delay line 8 overlap each other and consequently maintain the coincidence gate 4 negatively conditioned or blocked for approximately seven eighths of a pulse period, thereby preventing the passage of the second pulse of the A series of pulses.

The third pulse of the A series of pulses will pass via the coincidence gate 4 and cause production of another output pulse at the output terminal 10 (the second pulse of the E series) and will also cause production of another pair of negative pulses (the second pulses of the C and D series) which block the coincidence gate 4 to prevent the passage of the fourth pulse of the A series of pulses.

This procedure is repeated so that a relatively simple and inexpensive scaler is provided capable of producing the output pulse for every two input pulses applied thereto.

Therefore, by the proper selection of taps along the delay line 8 and employing suitable switches to select the taps, a scaler can be provided which is selectively capable of counting on any predetermined scale. For example, the first negative pulse produced by the pulse amplifier 6 could be additionally delayed for approximately one and three quarters of a pulse period and two and one eighths of a pulse period, and applied via the dotted lines and switch 12 (in the closed position) to the coincidence gate 4 so as to block the coincidence gate 4 when the third pulse of the A series of pulses is applied thereto. Thus, the scaler would be a ternary scaler capable of providing one output pulse for every three input pulses applied thereto.

Therefore, when the switch 12 is in the open position the scaler operates as a binary scaler and when in the closed position it operates as a ternary scaler.

Referring to Fig. 2 a scaling circuit in accordance with another embodiment of the invention is shown. For convenient reference, all positive and negative supply buses will generally be identified with a number corresponding with their voltage.

A series of regularly occurring pulses hereinafter referred to as clock pulses, is applied to the source 14. The source 14 is composed of a delay line 26 and a coincidence gate 13 comprising the crystal diodes 28 and 30 and the resistor 32.

One tap on the delay line 26 is connected to the cathode of crystal diode 28 while the clock pulse source is directly connected to the cathode of crystal diode 30. The anodes of crystal diodes 28 and 30 are interconnected and coupled via the resistor 32 to the positive supply bus 65. The junction of the anodes of crystal diodes 28 and 30 and resistor 32 is coupled to one input of the coincidence gate 16.

The gates used in this circuit are of the "coincidence" type and function to receive input signals and to pass the most negative signal. Therefore, if one of the input signals is positive and another is negative, the negative signal is passed and the positive signal is "blocked." When there is a coincidence of positive input signals, a positive signal appears at the output of the gate. In such a case, it may be stated that a positive signal is "gated" or "passed" by the gate.

When all of the input signals to a gate except one are made positive, the gate may be described as being "positively primed" or "positively conditioned" to pass a positive signal. However, when all of the input signals to a gate except one are made negative, the gate may be described as being "negatively primed" or "negatively conditioned" to block passage of a positive signal.

More specifically, if negative potentials are simultaneously present at the cathodes of the crystal diodes 28 and 30, both of the crystal diodes 28 and 30 will conduct, since the positive supply bus 65 tends to make the anodes of the crystal diodes 28 and 30 more positive. The voltage at the junction of the anodes of crystal diodes 28 and 30 will then be at a negative potential since, while the crystal diodes 28 and 30 are conducting, their anodes assume the potentials of the associated cathodes.

When a positive signal is fed only to the cathode of the crystal diode 28, the cathode is raised to a positive potential and is made more positive than the anode of the crystal diode 28 so that crystal diode 28 stops conducting. As a result, the potential at the junction of the anodes of the crystal diodes 28 and 30 remains at the negative potential level since the crystal diode 30 remains conductive.

In a similar manner, when a positive signal is only present at the cathode of the crystal diode 30 the potential at the junction of the anodes of the crystal diodes 28 and 30 will remain negative.

When the signals present at both of the cathodes of the crystal diodes 28 and 30 are positive, the anodes of the crystal diodes 28 and 30 are raised to approximately the same potential as their associated cathodes. Therefore, the potential at the junction of the anodes of the crystal diodes 28 and 30 rises to a positive potential. The resultant signal is transmitted from the output of the coincidence gate 13.

The output of the coincidence gate 13 is applied to one input of the coincidence gate 16 which is composed of the crystal diodes 34 and 36 and resistor 38. The anodes of the crystal diodes 34 and 36 are interconnected and coupled via resistor 38 to the positive supply bus 65.

The coincidence gate 16 operates in a similar manner as the coincidence gate 13. The junction of the anodes of the crystal diodes 34 and 36 and resistor 38 is coupled to one input of a buffer 18.

The buffer 18 comprises the crystal diodes 40 and 42 and the resistor 44. The cathodes of the crystal diodes 40 and 42 are interconnected and coupled via resistor 44 to the negative supply bus 70.

The buffer used in this circuit is also know as a logical "or" gate and functions to receive input signals and to pass the most positive signal. If a positive signal is applied to one or all of the inputs the positive signal is passed by the buffer. However, if all the input signals are negative a negative signal will be passed by the buffer.

More specifically, when negative signals (in the order of minus ten volts) are simultaneously present at the anodes of crystal diodes 40 and 42, the crystal diodes 40 and 42 are conductive, and the potential at the junction of the cathodes approaches the magnitude of the potential at the anodes. As a result, the negative signal appears at the output of the buffer 18.

If the potential at the anode of the crystal diode 40 increases in a positive direction the potential at the junction of the cathodes of the crystal diodes 40 and 42 approaches the positive potential level as this voltage is passed through the conducting crystal diode 40. The crystal diode 42 stops conducting since its anode is more negative than the junction of the cathodes of the crystal diodes 40 and 42. As a result a corresponding positive potential appears at the output of the buffer 18.

The junction of the cathodes of the crystal diodes 40 and 42 and the resistor 44 is coupled to one of the inputs of the coincidence gate 20. A tap on delay line 26 is coupled to the remaining input of the coincidence gate 20.

The coincidence gate 20 is composed of the crystal diodes 46 and 48 and the resistor 50 which connects their interconnected anodes to the positive supply bus 65. The coincidence gate 20 functions in a similar manner as the coincidence gate 13 previously described. The junction of the anodes of the crystal diodes 46 and 48 and the resistor 50 of the coincidence gate 20 is coupled to the input of the pulse amplifier 22.

Pulse amplifier 22 comprises a buffer 55 composed of the crystal diodes 53 and 54 and the resistor 52, the vacuum tube 56, and the pulse transformer 64. The vacuum tube 56 comprises the control grid 60, the anode 58, and the cathode 62 which is grounded. The pulse transformer 64 is composed of a primary winding 65 and two secondary windings 68 and 72.

The cathodes of the crystal diodes 53 and 54 of the buffer 55 are interconnected and their junction is coupled via resistor 52 to the negative supply bus 70. The junction is also connected to the control grid 60 of vacuum tube 56. The anode 58 of the vacuum tube 56 is coupled via the primary winding 65 of the pulse transformer 64 to the positive supply bus 250. The outer ends of the secondary windings 68 and 72 of the pulse transformer 64 are coupled respectively to the positive output terminal and the negative output terminal of the pulse amplifier 22. The inner ends of the secondary windings 68 and 72 are coupled respectively to the negative supply bus 10 and the positive supply bus 5.

The anode of the crystal diode 54 of the buffer 55 is connected to the negative supply bus 5. The crystal diode 54 thereby clamps the control grid 60 of vacuum tube 56 at a potential of minus five volts thus preventing the voltage applied to the control grid 60 from becoming more negative than minus five volts.

When a positive pulse is fed to the anode of the crystal diode 53, the pulse is passed through the buffer 55 and applied to the control grid 60 of vacuum tube 56. The vacuum tube 56 inverts the pulse and applies it to the primary winding 65 of the pulse transformer 64. The pulse transformer 64 is wound to produce a positive pulse having a magnitude of about five volts in the secondary winding 68, and a negative pulse having a magnitude of ten volts in the secondary winding 72. The positive pulse in the secondary winding 68 is simultaneously applied to the output terminal 74 and to an input of the buffer 18. The negative pulse in the secondary winding 72 of the pulse transformer 64 is applied to the delay line 24.

The delay line 24 is of the lumped parameter type and functions to delay received pulses for discrete periods of time. The delay line 24 comprises a plurality of inductors 76 connected in series with the associated capacitors 78 which couple a point on each inductor 76 to the positive supply bus 5. The delay line 24 is terminated by a resistor 84 in order to prevent reflections. The taps 80 and 82 are connected at appropriate points along the delay line 24 to provide predetermined delays.

A pulse which is fed to the delay line 24 will be delayed for increasing periods of time before successively appearing at the taps 80 and 82. The tap 80 of delay line 24 is coupled to an input of the coincidence gate 16. The tap 82 is connectable via switch 86 (normally open) to another input of the coincidence gate 16.

The operation of the scaling circuit shown in Fig. 2 will be discussed in connection with the wave forms illustrated in Fig. 4.

Figure 4:
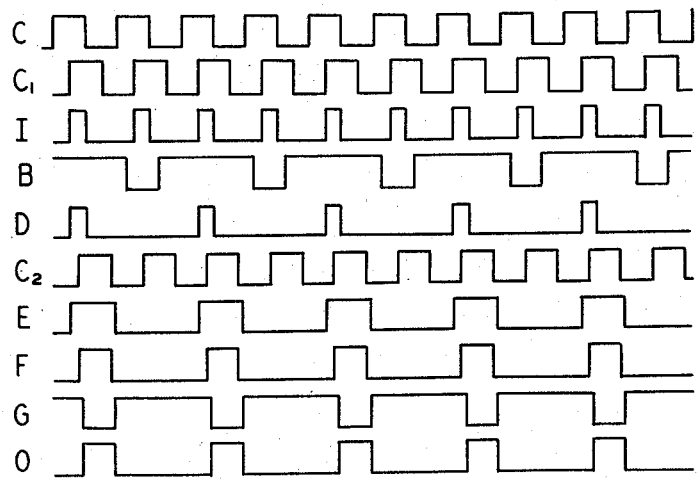
Fig. 4 shows the wave forms existing at various points of the scaling circuit shown in Fig. 2 when adapted to operate as a binary scaler.

In operation, a series of clock pulses is applied to the source 14 (see the C series of pulses in Fig. 4). The series of clock pulses is applied directly to one input of the coincidence gate 13 and to the delay line 26. After being delayed approximately one quarter of a pulse period (see the $C_1$ series of pulses in Fig. 4), the delayed clock pulses are applied to the other input of gate 13. Inasmuch as the input signals to the gate 13 are one quater of a pulse period out of phase, a series of narrow positive pulses (see the I series of pulses in Fig. 4) is passed by the gate 13 to one input of the coincidence gate 16.

The pulse amplifier 22 is initially nonconducting and therefore the positive and negative output terminals of the pulse amplifier 22 are in their normal condition. Consequently, the positive potential at the negative output terminal of the pulse amplifier 22 is applied via the delay line 24 and tap 80 to the other input of the coincidence gate 16 to positively condition the coincidence gate 16, while the negative potential at the positive output terminal of the pulse amplifier 22 is applied to one input of the buffer 18 to negatively condition the buffer 18. Therefore, the first narrow pulse of the I series of pulses is passed via the coincidence gate 16 to one input of the buffer 18 (see the D series of pulses).

The first pulse of the D series of pulses is passed via the buffer 18 and applied to one input of the coincidence gate 20. The series of clock pulses delayed by approximately three eighths of a pulse period (see the $C_2$ series of pulses in Fig. 4) is applied from a tap on delay line 26 in source 14 to the other input of the coincidence gate 20. The delayed clock pulses are timed so that the starting time of a delayed clock pulse coincides approximately with the center of a D pulse.

When the first pulse of the D series of pulses reaches its full magnitude at the output of the buffer 18, the coinciding delayed clock pulse is started through the coincidence gate 20 and starts to pass to the input of the pulse amplifier 22. This pulse is amplified and causes a positive pulse (see the O series of pulses in Fig. 4) to begin to appear at the positive output terminal of the pulse amplifier 22 and therefore at the output terminal 74. Simultaneously a negative pulse (see the G series of pulses in Fig. 4) begins to appear at the negative output terminal of the pulse amplifier 22. Both of these pulses appear after a short period of time due to the inherent delay of the pulse amplifier 22.

The positive output terminal of the pulse amplifier 22 is also coupled to one input of the buffer 18 so that the positive signal which appears at the positive output terminal of the pulse amplifier 22 is regenerative and will continue to exist until slightly after the delayed clock pulse terminates at the coincidence gate 20 (see the E series of pulses). This effectively permits the entire delayed clock pulse to be gated through the coincidence gate 20 even though the first pulse of the D series of pulses has decayed before the end of the delayed clock pulse.

Stated otherwise, a clock pulse is passed through the coincidence gate 20 from the earliest coincidence of that clock pulse with the D pulse passed by the buffer 18, until the termination of that clock pulse. As a result, a clock pulse is substituted for the D pulse and applied to the pulse amplifier 22.

After a delay of approximately three quarters of a pulse period, the negative pulse produced by the pulse amplifier 22 is applied via tap 80 of the delay line 24 to negatively condition the coincidence gate 16 such that the second pulse of the I series of pulses is blocked or deleted.

The third pulse of the I series of pulses is passed by the coincidence gate 16 to the buffer 18.

The circuit operates in a similar manner as previously described producing another output pulse at the output terminal 74, and a negative pulse which is used to block the fourth pulse of the I series of pulses.

Therefore the circuit of Fig. 2 functions as a scaler capable of providing one output pulse for every two input pulses applied thereto. By the proper selection of taps along the delay line 24 and suitable switches, a circuit can be provided which is capable of counting on any selected scale. For example, the first negative pulse produced by the pulse amplifier 22 could be additionally delayed for approximately one and three quarters of a pulse period and applied via tap 82 and the closed switch 86 to another input of the coincidence gate 16 so as to negatively condition the coincidence gate 16 when the third pulse of the I series of pulses is applied thereto. Thus, the scaler would be capable of providing one output pulse for every three input pulses applied thereto.

Therefore, when the switch 86 is in the open position the scaler operates as a binary scaler, and when in the closed position the scaler operates as a ternary scaler.

Therefore, in accordance with the invention, a simple, inexpensive and reliable scaling circuit is provided which is capable of operating on any predetermined scale.

What is claimed is:

1. A scaling circuit for producing output pulses in response to a number of input pulses in accordance with a predetermined scale comprising a source of input pulses, a first coincidence gate having a plurality of inputs and an output, said source of input pulses being coupled to one input of said first coincidence gate, a buffer having a plurality of inputs and an output, the output of said first coincidence gate being coupled to one input of said buffer, a second coincidence gate having a plurality of inputs and an output, a source of clock pulses, the output of said buffer and said source of clock pulses being coupled to different inputs of said second coincidence gate, a pulse amplifier having an input and positive and negative output terminals, the output of said second coincidence gate being coupled to the input of said pulse amplifier, a delay line for coupling the negative output terminal of said pulse amplifier to another input of said first coincidence gate, and an output terminal, the positive output terminal of said pulse amplifier being coupled to another input of said buffer and to the output terminal.

2. A frequency dividing circuit for producing output pulses having a predetermined ratio to the frequency of a series of input pulses, said circuit comprising a source of regularly occurring input pulses, an output pulse generator having an input terminal to which pulses may be applied and producing an output pulse for each pulse applied to said input terminal, a normally open gate having a plurality of gate blocking terminals and connected between said input pulse source and said input terminal, a pulse delaying device connected to the output of said output pulse generator and having one delay point connected to a blocking terminal of said gate to apply a gate blocking voltage to said gate during the time of occurrence of the input pulse following the input pulse which caused generation of an output pulse whereby said gate does not pass said following input pulse to said output pulse generator and selectively settable connections between other delay points of said pulse delaying device and other blocking terminals of said gate to apply gate blocking voltages to said gate during the occurrence of still later input pulses to prevent passage of said still later input pulses through said gate.

3. A scaling circuit for producing output pulses having a predetermined time relation to the pulses of a series of input pulses comprising a source of regularly occurring input pulses, an output device generating a pair of output pulses of opposite polarity in response to each input pulse applied thereto, a gate having an output connected to said output device, an input terminal, and a plurality of gate blocking terminals, means to feed input pulses from said source to said input terminal of said gate, a pulse delaying device connected to a positive supply voltage and receiving the negative pulse output of said output device, said delay device having a plurality of tapped connections, the negative output pulse being delayed in said pulse delay device so as to be present at any tapped connection during the occurrence of a predetermined one of the input pulses following the input pulse which was applied to said output device, and means selectively coupling said tapped connections to said gate blocking terminals of said gate whereby a generated output pulse prevents transmission of selected ones of said input pulses through said gate to said output device.

References Cited in the file of this patent

UNITED STATES PATENTS

| | | |
|---|---|---|
| 2,403,873 | Mumma | July 9, 1946 |
| 2,538,277 | Seeley | Jan. 16, 1951 |
| 2,538,278 | Brown et al. | Jan. 16, 1951 |
| 2,568,319 | Christensen | Sept. 18, 1951 |
| 2,613,318 | Snyder et al. | Oct. 7, 1952 |
| 2,660,668 | Williams | Nov. 24, 1953 |
| 2,662,977 | De Rosa | Dec. 15, 1953 |
| 2,753,455 | Diven et al. | July 3, 1956 |

OTHER REFERENCES

Wireless Engineer, August 1945, "Time-Base Converter and Frequency Divider," Moss, pages 368–372.